(12) United States Patent
Bae

(10) Patent No.: US 8,491,142 B2
(45) Date of Patent: Jul. 23, 2013

(54) BACKLIGHT ASSEMBLY HAVING FLUORESCENT LAMPS AND DISPLAY DEVICE HAVING THE BACKLIGHT ASSEMBLY

(75) Inventor: Hyun-Chul Bae, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 318 days.

(21) Appl. No.: 12/979,816

(22) Filed: Dec. 28, 2010

(65) Prior Publication Data

US 2011/0164403 A1 Jul. 7, 2011

(30) Foreign Application Priority Data

Jan. 5, 2010 (KR) ........................ 10-2010-0000496

(51) Int. Cl.
*F21V 21/00* (2006.01)

(52) U.S. Cl.
USPC ..................... 362/97.1; 362/260; 362/217.08; 362/217.16; 439/239; 439/242

(58) Field of Classification Search
USPC .......... 362/260, 221, 225, 217.08, 97.1–97.3, 362/217.09, 217.16; 439/611, 619, 699.1, 439/226, 232, 233, 239, 242; 313/491
See application file for complete search history.

(56) References Cited

U.S. PATENT DOCUMENTS

| | | | | |
|---|---|---|---|---|
| 4,549,110 | A | * | 10/1985 | Berman et al. ................ 313/485 |
| 5,311,097 | A | * | 5/1994 | Mepham et al. ................ 313/51 |
| 8,104,946 | B2 | * | 1/2012 | An et al. ....................... 362/634 |
| 2002/0121856 | A1 | * | 9/2002 | Tsai ............................... 313/491 |

FOREIGN PATENT DOCUMENTS

| | | |
|---|---|---|
| JP | 2001-216822 | 8/2001 |
| JP | 2008-262819 | 10/2008 |
| KR | 100765429 | 10/2007 |

* cited by examiner

*Primary Examiner* — Thomas Sember
(74) *Attorney, Agent, or Firm* — F. Chau & Associates, LLC

(57) ABSTRACT

Provided is a backlight assembly which can be assembled with increased efficiency and has improved reliability. The backlight assembly includes a fluorescent lamp which includes a fluorescent lamp tube and a pair of lamp leads formed at each end of the fluorescent lamp tube, end caps which surround each end of the fluorescent lamp tube and fix the lamp leads in place, and a power supply terminal units which supply power to the lamp leads, wherein an end cap exposes at least part of each of the lamp leads corresponding thereto.

20 Claims, 7 Drawing Sheets

BACKLIGHT ASSEMBLY HAVING FLUORESCENT LAMPS AND DISPLAY DEVICE HAVING THE BACKLIGHT ASSEMBLY

This application claims priority from Korean Patent Application No. 10-2010-0000496 filed on Jan. 5, 2010 in the Korean Intellectual Property Office, the disclosure of which is incorporated herein by reference in its entirety.

BACKGROUND OF THE INVENTION

1. Technical Field

The present invention relates to a backlight assembly having fluorescent lamps and a display device having the backlight assembly.

2. Discussion of the Related Art

Liquid crystal displays (LCDs) display images using electrical and optical characteristics of liquid crystals. LCDs, which are one type of flat panel display, are thin, lightweight, and small-sized. Due to these and other various features, the flat panel displays are widely used in various fields.

Since liquid crystals of an LCD are non light-emitting elements that cannot emit light by themselves, some LCDs use a backlight assembly that provides light to the liquid crystal layer.

A backlight assembly may include, as its light sources, hot cathode fluorescent lamps (HCFLs), cold cathode fluorescent lamps (CCFLs), or light-emitting diodes (LEDs).

While LEDs are point light sources, CCFLs and HCFLs are line light sources. In a CCFL, electrons generated by an electric field excite the gas (e.g., mercury) inside a glass tube, and the excited gas produces ultraviolet rays. The ultraviolet rays stimulate a fluorescent material coated on the glass tube, thereby emitting light. CCFLs give off less heat than HCFLs and have a long useful life. On the other hand, in an HCFL, electrons are generated not by an electric field, but by heat. Since HCFLs can provide up to 30% higher luminance than CCFLs with the same power consumption, they are drawing attention as light sources that can replace CCFLs.

An HCFL has two lamp leads at each end thereof while a CCFL has only one lamp lead. Due to this structural difference, an HCFL cannot be mounted in a case using a conventional CCFL, socket. Accordingly, the process of assembling a backlight assembly employing HCFLs is complicated and difficult to automate, thereby increasing the time required to assemble the backlight assembly.

SUMMARY OF THE INVENTION

Aspects of the present invention provide a backlight assembly in which hot cathode fluorescent lamps (HCFLs) can be installed with increased efficiency and in an automated manner.

Aspects of the present invention also provide a display device having the backlight assembly.

However, aspects of the present invention are not restricted to those set forth herein. The above and other aspects of the present invention will become more apparent to one of ordinary skill in the art to which the embodiments of the present invention pertain by referencing the more detailed descriptions of the embodiments of the present invention given below.

According to an aspect of the present invention, there is provided a backlight assembly including a fluorescent lamp which includes a fluorescent lamp tube and a plurality of lamp leads formed at each end of the fluorescent lamp tube, end caps which surround each end of the fluorescent lamp tube and fix the lamp leads in place, and power supply terminal units which supply power to the lamp leads, wherein an end cap exposes at least part of each of the lamp leads corresponding thereto.

According to an aspect of the present invention, there is provided a display device including a backlight assembly including a fluorescent lamp which includes a fluorescent lamp tube and a plurality of lamp leads formed at each end of the fluorescent lamp tube, end caps which surround each end of the fluorescent lamp tube and fix the lamp leads in place, and power supply terminal units which supply power to the lamp leads, and a display panel which displays an image using light emitted from the backlight assembly, wherein an end cap exposes at least part of each of the lamp leads corresponding thereto.

In the above backlight assembly and the display device having the same, fluorescent lamps can be easily and stably fixed in place. Thus, the backlight assembly can be assembled with increased efficiency, and damage to the fluorescent lamps during the assembling process can be prevented. Furthermore, the process of assembling the backlight assembly can be simplified and automated, thereby reducing manufacturing costs.

BRIEF DESCRIPTION OF THE DRAWINGS

The embodiments of the present invention will become more apparent by describing in detail exemplary embodiments with reference to the attached drawings, in which.

DETAILED DESCRIPTION OF EXEMPLARY EMBODIMENTS

Figure 1:
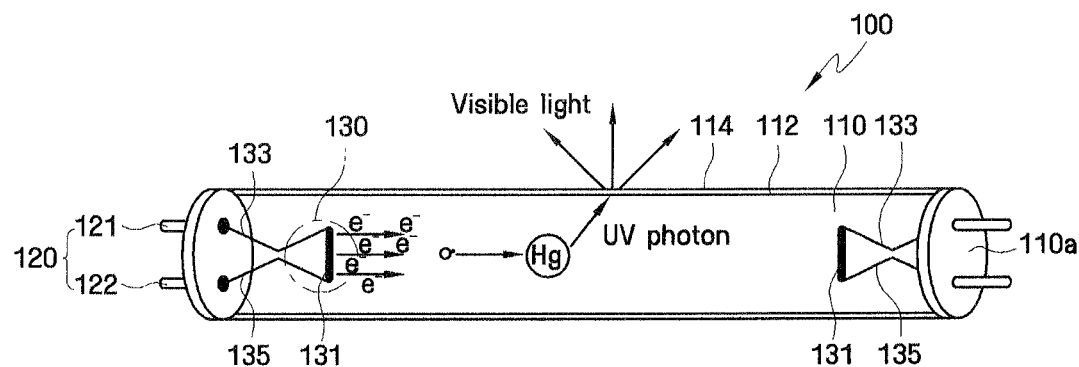
FIG. 1 is a cross-sectional view of a fluorescent lamp used in a backlight assembly according to an exemplary embodiment of the present invention.

Embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. In the drawings, the sizes and relative sizes of layers and regions may be exaggerated for clarity.

It will be understood that when an element or layer is referred to as being "on" another element or layer, the element or layer can be directly on another element or layer or intervening elements or layers may also be present.

Hereinafter, exemplary embodiments of the present invention will be described in detail with reference to the attached drawings.

FIG. 1 is a cross-sectional view of a fluorescent lamp 100 for use in a backlight assembly according to an exemplary embodiment of the present invention.

Referring to FIG. 1, the fluorescent lamp 100 includes a fluorescent lamp tube 110, hot electron emitters 130, and two pairs of a first lamp lead 121 and a second lamp lead 122. That is, the fluorescent lamp 100 includes two hot electron emitters 130 respectively disposed at both ends of the fluorescent lamp tube 110, two first lamp leads 121, and two second lamp leads 122.

The fluorescent lamp tube 110 includes a discharge tube 112 and a phosphor layer 114 formed in the discharge tube 112.

The hot electron emitters 130 are disposed respectively at both ends of the fluorescent lamp tube 110. According to an exemplary embodiment, each of the hot electron emitters 130 includes a filament 131, a first wire 133, and a second wire 135. The filament 131 is coated with barium, strontium or the like so as to facilitate the emission of electrons. According to an embodiment, each of the hot electron emitters 130 may include a plate-shaped electrode or a net-shaped electrode in place of the filament 131.

The first and second wires 133 and 135 are connected respectively to opposing ends of the filament 131. Respective ends of the first and second wires 133 and 135 may extend from side surfaces 110a of the fluorescent lamp tube 110.

In the operation of the fluorescent lamp 100, as the filament 131 is heated, electrons are generated. The generated electrons excite the gas (e.g., mercury) inside the fluorescent lamp tube 110, thereby producing ultraviolet rays. As the ultraviolet rays stimulate the phosphor layer 114 coated on the fluorescent lamp tube 110, light is emitted.

The first lamp lead 121 is disposed at each end of the fluorescent lamp tube 110 and is electrically connected to the first wire 133 of each of the hot electron emitters 130.

The second lamp lead 122 is disposed at each end of the fluorescent lamp tube 110, is separated from the first lamp lead 121 and is electrically connected to the second wire 135 of each of the hot electron emitters 130.

According to an exemplary embodiment, the first and second lamp leads 121 and 122 are bar-shaped (cylindrical) and extend parallel to each other.

Figure 2:
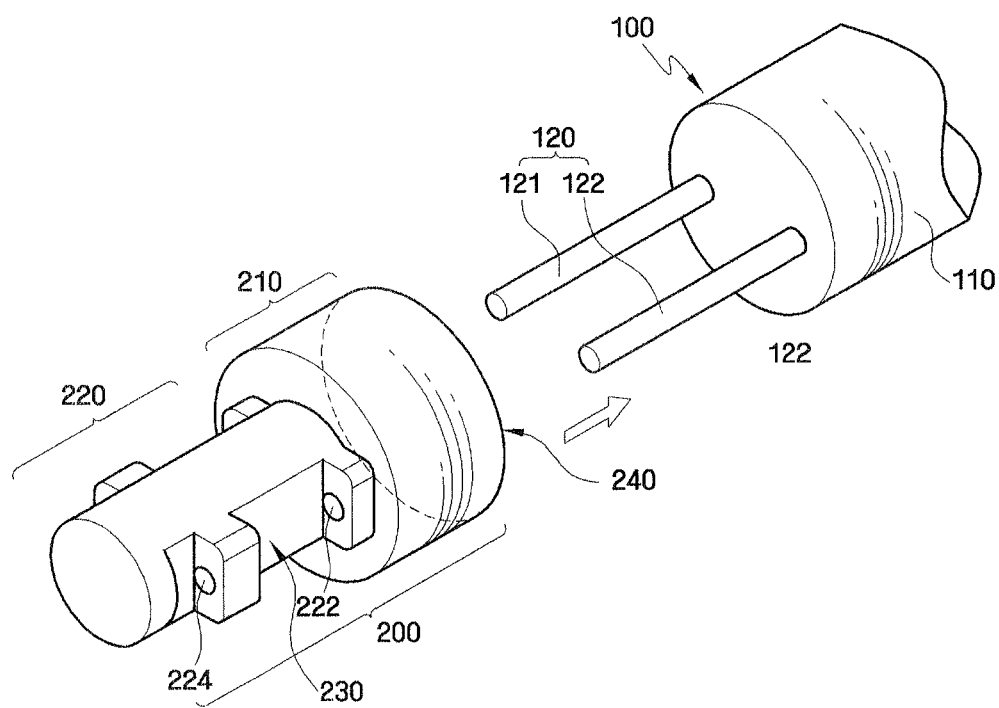
FIG. 2 is a perspective view of an end cap used in the backlight assembly according to an exemplary embodiment of the present invention.
Figure 3:
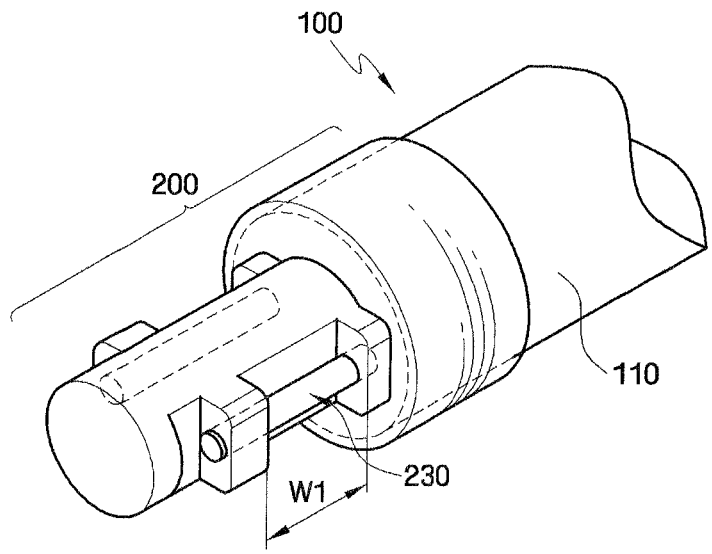
FIG. 3 is a perspective view showing the fluorescent lamp of FIG. 2 and the end cap of FIG. 2 which are coupled to each other.

FIG. 2 is a perspective view of an end cap 200 used in a backlight assembly according to an exemplary embodiment of the present invention. FIG. 3 is a perspective view showing the end cap 200 of FIG. 2 and the fluorescent lamp 100 of FIG. 2 which are coupled to each other.

Referring to FIGS. 2 and 3, the end cap 200 according to an exemplary embodiment includes a lamp end receiving portion 210, a lead receiving portion 220, lead exposing portions 230, and an aperture portion 240.

The lamp end receiving portion 210 is shaped like a hollow cylinder to surround the fluorescent lamp tube 110 of the fluorescent lamp 100. An inner diameter of the lamp end receiving portion 210 is substantially equal to a diameter of the fluorescent lamp tube 110. Accordingly, an end of the fluorescent lamp tube 110 can be inserted into the lamp end receiving portion 210 through the aperture portion 240.

The lead receiving portion 220 comprises an insulating material and surrounds a lamp lead unit 120 which includes the first lamp lead 121 and the second lamp lead 122. The lead receiving portion 220 insulates the first and second lamp leads 121 and 122 from each other and also prevents the lamp lead unit 120 from being damaged by a physical impact and each of the hot electron emitters 130 from being damaged by external electromagnetic waves. Furthermore, since the lead receiving portion 220 houses the lamp lead unit 120 therein, it can prevent the lamp lead unit 120 from being damaged or deformed by a physical force during the process of assembling the fluorescent lamp 100.

According to an embodiment, the lead receiving portion 220 may extend integrally from the lamp end receiving portion 210. That is, the lead receiving portion 220 and the lamp end receiving portion 210 may be formed as a single piece.

The lead exposing portions 230 may be recessed portions respectively formed in part of opposing sides of the lead receiving portion 220. The lead exposing portions 230 expose portions of the lamp lead unit 120, including the first and second lamp leads 121, 122, when the fluorescent lamp 100 is coupled to the end cap 200. The lead exposing portions 230 may be formed by removing portions of the lead receiving portion 220.

When the end cap 200 and the fluorescent lamp 100 are coupled to each other as shown in FIG. 3, an inner surface of the lamp end receiving portion 210 contacts an outer surface of the fluorescent lamp tube 110, and the lamp end receiving portion 210 partially overlaps the fluorescent lamp tube 110. Thus, the damage to an end of the fluorescent lamp tube 110 due to an external impact can be prevented.

The fluorescent lamp 100 is guided by the lamp end receiving end 210, and the first and second leads 121 and 122 of the fluorescent lamp 100 are inserted into holes 222 and 224 of the lead receiving portion 220, the holes 222 and 224 each being formed on opposing sides of the lead receiving portion 220.

The inner diameter of the lamp end receiving portion 210 may be substantially equal to the diameter of the fluorescent lamp tube 110, and a diameter of the lead receiving portion 220 may be smaller than the inner diameter of the lamp end receiving portion 210. Accordingly, the fluorescent lamp tube 110 is fixed in place by the lamp end receiving portion 210, and the first and second leads 121 and 122 are inserted into the holes 222 and 224, thereby restricting the movement of the fluorescent lamp tube 110.

Referring to FIG. 3, portions of the lamp lead unit 120 are exposed through the lead exposing portions 230. A width W1 of each of the lead exposing portions 230 may be equal to or greater than a width W2 (see FIG. 4) of a power supply terminal unit 300.

Figure 4:
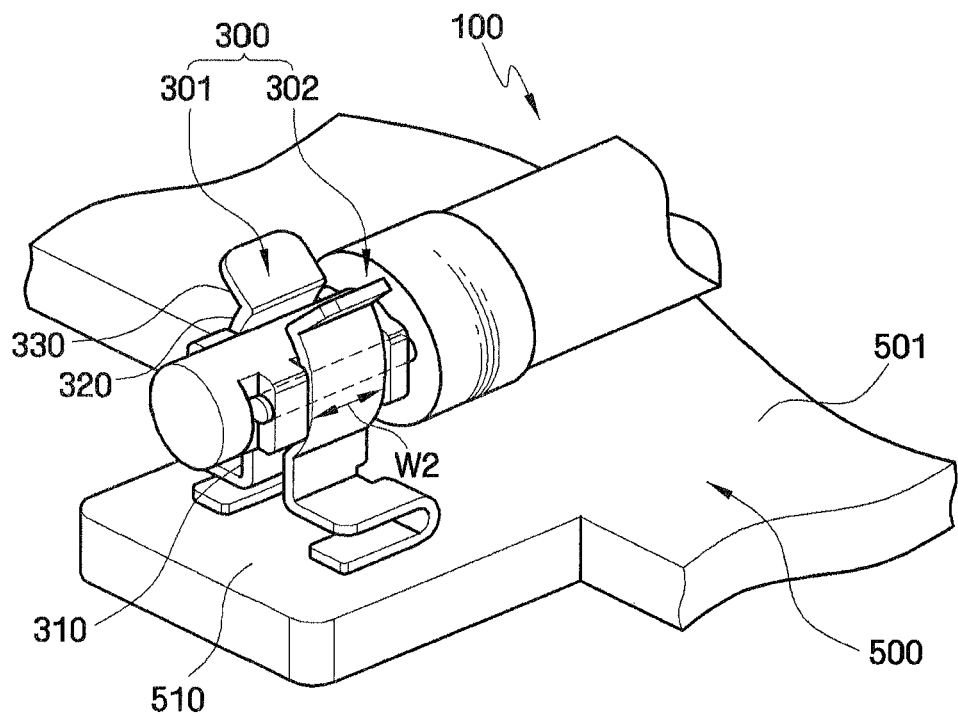
FIG. 4 is a perspective view showing a power supply terminal unit and the fluorescent lamp which are coupled to each other.

FIG. 4 is a perspective view showing the power supply terminal unit 300 and the fluorescent lamp 100 which are coupled to each other. In FIG. 4, first and second power supply terminals 301 and 302 installed in a housing (not shown in FIG. 4) are illustrated. The first and second power supply terminals 301 and 302 are housed in the housing, thereby completing a lamp socket. The housing and the lamp socket will be described later referring to FIGS. 5 through 9. Referring to FIG. 4, the power supply terminal unit 300 includes the first power supply terminal 301 and the second power supply terminal 302. The first power supply terminal 301 contacts a power supply board 500 and receives first power from the power supply board 500. The second power supply terminal 302 is separated from the first power supply terminal 301 to be electrically insulated from the first power supply terminal 301 and receives second power from the power supply board 500.

The first power is supplied to the first power supply terminal 301 via the power supply board 500, and the second power is supplied to the second power supply terminal 302 via the power supply board 500. The first power and the second power are different from each other and may have opposite polarities. That is, a positive voltage (+) may be applied to the first power supply terminal 301 and a negative voltage (−) may be applied to the second power supply terminal 302, or vice versa.

According to an embodiment, the power supply terminal unit 300 may include a terminal portion 310, a coupling portion 320, and a receiving portion 330. That is, the first power supply terminal 301 includes a first terminal portion 311, a first coupling portion 321 and a first receiving portion 331, and the second power supply terminal 302 includes a second terminal portion 312, a second coupling portion 322, and a second receiving portion 332 (see FIG. 5). The first power supply terminal 301 and the second power supply portion 302 form a pair and are symmetrical to each other.

The first and second power supply terminals 301 and 302 may be made of a conductive metal material.

The terminal portion 310 is electrically connected to a power output terminal which is formed in the power supply board 500 and thus receives from the power output terminal a voltage that is to be applied to the fluorescent lamp 100. The received voltage is delivered to the coupling portion 320 which is connected to the terminal portion 310.

The coupling portion 320 is connected to the terminal portion 310 and may have a similar shape to the exterior shape of the fluorescent lamp 100. For example, according to an embodiment, the coupling portion has a semicircular shape. Therefore, the first coupling portion 321 and the second coupling portion 322 almost form a circle. When the end cap 200 is inserted between the first and second power supply terminals 301 and 302, the first coupling portion 321 and the second coupling portion 322 surround an outer circumference of the lead receiving portion 220 of the end cap 200. Due to their flexibility, the first and second coupling portions 321 and 322 hold the lead receiving portion 220 For example, the first and second coupling portions 321 and 322 can be moved apart upon insertion of the end cap 200 between the first and second coupling portions 321 and 322 and then spring back to surround and apply pressure to the end cap 200 and hold the lead receiving portion 220 in place.

As shown in FIG. 4, the coupling portion 320 directly contacts the lamp lead unit 120 (i.e., the first and second lamp leads 121, 122), which is exposed through the lead exposing portions 230 formed in the lead receiving portion 220, thereby supplying power to the lamp lead unit 120. That is, the first coupling portion 321 directly contacts and is electrically connected to the first lamp lead 121, and the second coupling portion 322 directly contacts and is electrically connected to the second lamp lead 122.

Since the lamp lead unit 120 of the fluorescent lamp 100 can contact the power supply terminal unit 300 without requiring a soldering process, the process of assembling the backlight assembly is simplified, and the time required to assemble the backlight assembly is reduced.

Referring to FIG. 4, the receiving portion 330 may extend in a straight line and at an angle with respect to the coupling portion 320 to provide a path along which the fluorescent lamp 100 can be coupled to the coupling portion 320. That is, an end of the coupling portion 320 is connected to the terminal portion 310, and the other end of the coupling portion 320 is connected to the receiving portion 330.

The distance between the first receiving portion 331 and the second receiving portion 332 may be increased as the distance from respective points of contact between the first and second receiving portions 331 and 332 and the first and second coupling portions 321 and 322 increases. Since the distance between the first receiving portion 331 and the second receiving portion 332 is gradually increased as the distance from the coupling portion 320 increases, the fluorescent lamp 100 can easily pass through the receiving portion 330 of the power supply terminal unit 300. In addition, after the fluorescent lamp 100 is coupled to the coupling portion 320, the receiving portion 330 restricts movement of the fluorescent lamp 100, thereby preventing the fluorescent lamp 100 from slipping out of the coupling portion 320. Furthermore, since a cross section of each of the first and second receiving portions 331 and 332 is shaped like a linear plate, the fluorescent lamp 100 can be installed on the power supply terminal unit 300 using an automated lamp assembling machine. In this regard, installation of the fluorescent lamp 100 is facilitated.

Referring again to FIG. 4, the width W2 of the coupling portion 320 is equal to the width W1 of each of the lead exposing portions 230. However, the present invention is not limited thereto. The width W2 of the coupling portion 320 may be smaller than the width W1 of each of the lead exposing portions 230.

Figure 5:
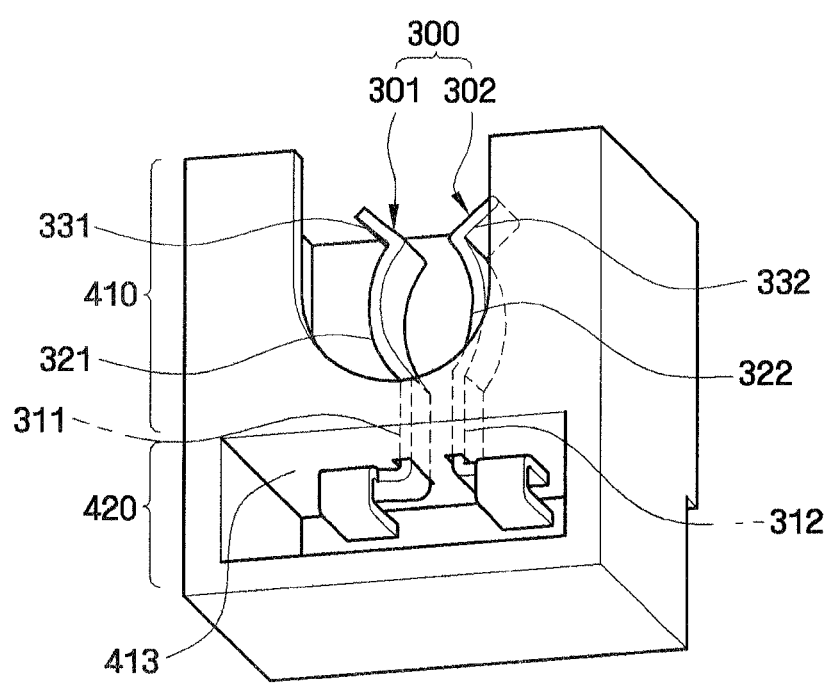
FIG. 5 is a view showing a lamp socket used in the backlight assembly according to an exemplary embodiment of the present invention.
Figure 6:
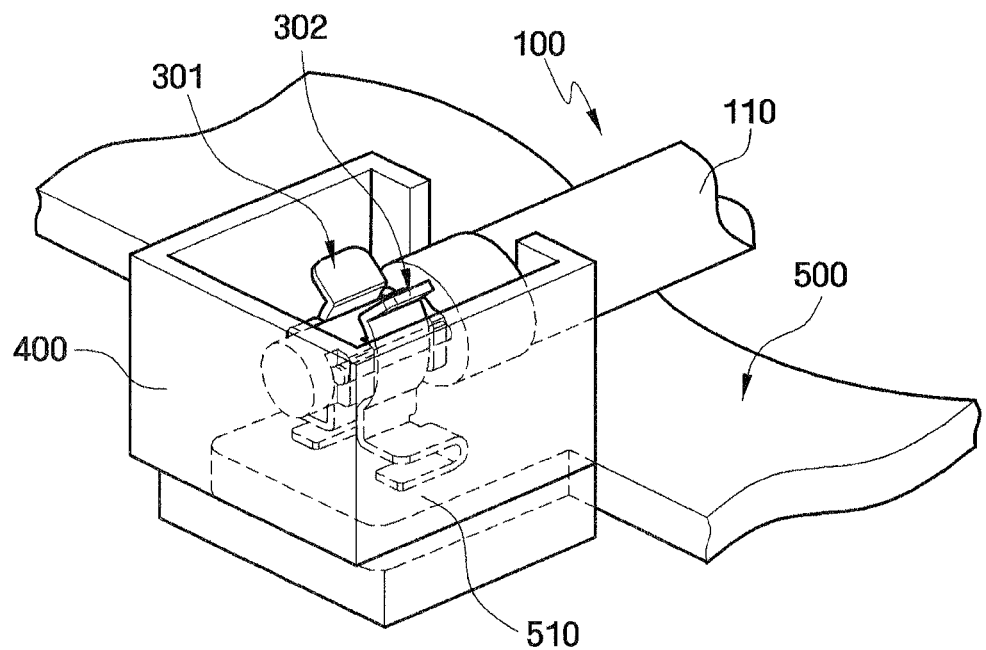
FIG. 6 is a perspective view showing the lamp socket and the fluorescent lamp which are coupled to each other.
Figure 7:
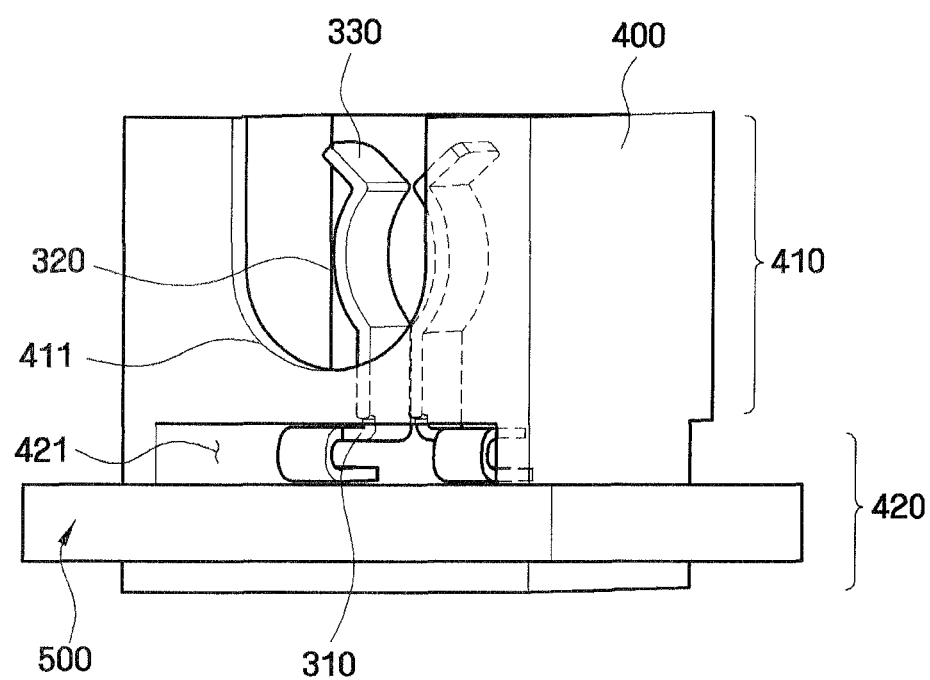
FIG. 7 is a perspective view showing the lamp socket and a power supply board which are coupled to each other.
Figure 8:
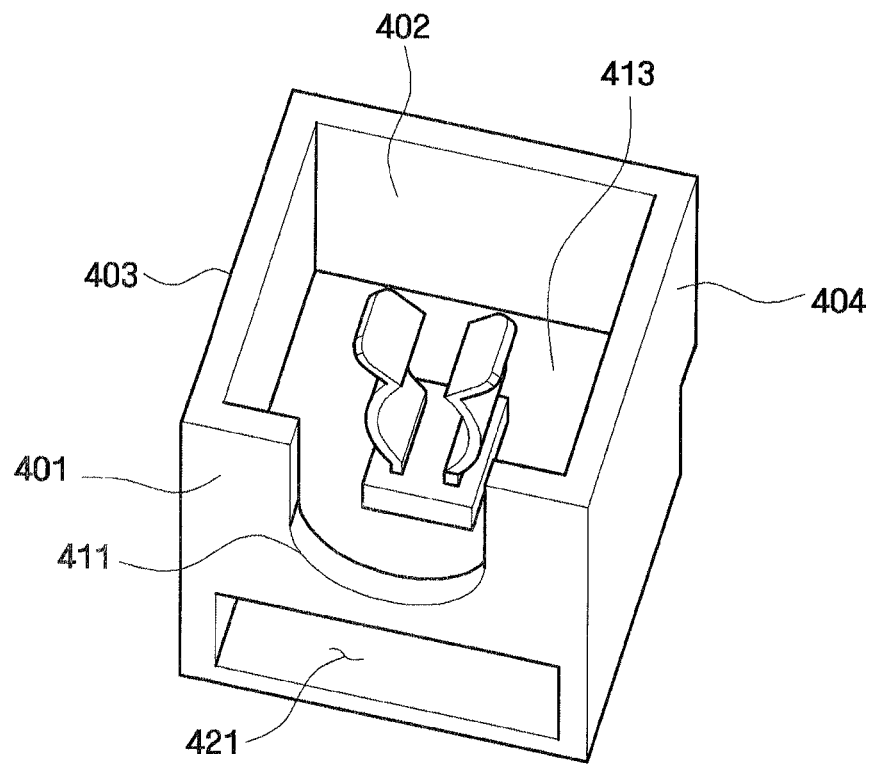
FIG. 8 is a view of the lamp socket seen from an upper aperture of a housing.

FIG. 5 is a view showing a lamp socket used in the backlight assembly according to an exemplary embodiment of the present invention. FIG. 6 is a perspective view showing the lamp socket and the fluorescent lamp 100 which are coupled to each other. FIG. 7 is a perspective view showing the lamp socket and the power supply board 500 which are coupled to each other. FIG. 8 is a view of the lamp socket seen from an upper aperture of the housing 400. As described above, the lamp socket comprises the power supply terminals 300 housed in the housing 400, and the housing 400.

Referring to FIGS. 5 through 8, the housing 400 includes a holder body 410 and an inverter coupling portion 420. According to an embodiment, the housing 400 may be a molded part manufactured using an injection molding method. The holder body 410 is shaped approximately like a hexahedron having an open top surface, but is not limited to this shape. The holder body 410 includes a lower surface 413 and first, second, third and fourth side surfaces 401, 402, 403 and 404 which surround the lower surface 413. The first side surface 401 and the second side surface 402 face each other. The third side surface 403 and the fourth side surface 404 face each other and are connected respectively to the first side surface 401 and the second side surface 402.

The lower surface 413 includes holes having a shape corresponding to the shape of the terminal portion 310 of the power supply terminal unit 300, so that the terminal portion 310 can penetrate the holes. More specifically, the lower surface 413 has a first hole which corresponds to the position of the first terminal portion 311 of the first power supply terminal 301 and a second hole which corresponds to the position of the second terminal portion 312 of the second power supply terminal 302.

A lamp guide groove 411 is formed in an upper portion of the holder body 410. Specifically, the lamp guide groove 411 is formed to a predetermined depth from an upper end of the first side surface 401 and is rounded to correspond to the shape of the fluorescent lamp 100 in order to support an end of the fluorescent lamp tube 110.

The inverter coupling portion 420 disposed under the lower surface 413 has an inverter inserting groove 421.

The inverter inserting groove 421 is formed to a predetermined depth from the first side surface 401 in the direction toward the second side surface 402. Each coupling protrusion 510 of the power supply board 500 is inserted into an inverter inserting groove 421. When each coupling protrusion 510, which is a portion of the power supply board 500, is inserted into an inverter inserting groove 421 in a sliding manner, power output terminals formed in the power supply board 500 are electrically connected to the first terminal portion 311 and the second terminal portion 312 of a power supply terminal unit 300. Therefore, the backlight assembly can be assembled and driving voltages can be applied to lamps such as the fluorescent lamps 100 without soldering a plurality of lamp holders, such as the housing 400, to wires connected to inverters and without soldering terminals of the lamp holders to a printed circuit board (PCB). Therefore, according to the embodiments of the present invention, the time required to assemble the backlight assembly can be reduced, and the damage to the fluorescent lamp due to the soldering process can be prevented. In addition, the inconvenience of having to separate all of the fluorescent lamps from the lamp holders to replace a defective inverter can be eliminated.

The first, second, third and fourth side surfaces 401, 402, 403 and 404 of the housing 400 are separated from the first and second power supply terminals 301 and 302 and surround the first and second power supply terminals 301 and 302. Accordingly, the first, second, third and fourth side surfaces 401, 402, 403 and 404 of the housing 400 electrically insulate the first and second power supply terminals 301 and 302 from the outside and block electromagnetic waves, thereby protecting the first and second power supply terminals 301 and 302.

The backlight assembly according to an exemplary embodiment may include a plurality of fluorescent lamps 100.

Figure 9:
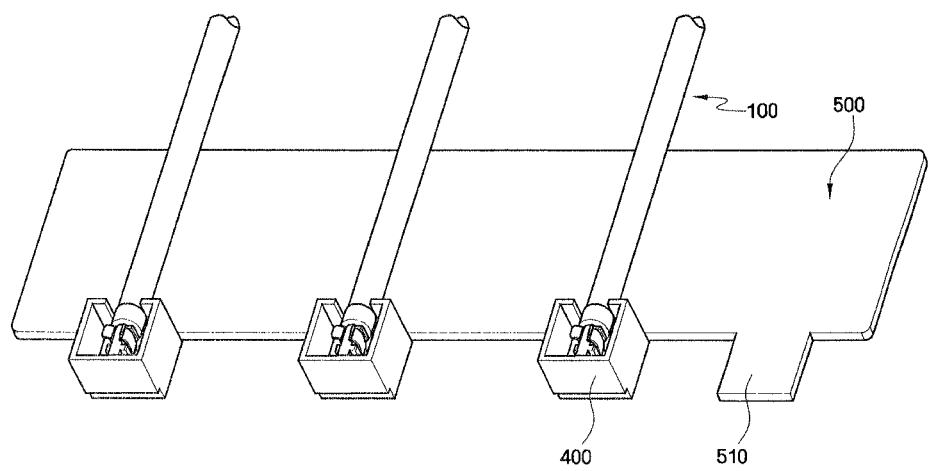
FIG. 9 is a view showing a plurality of fluorescent lamps installed in the backlight assembly according to an exemplary embodiment of the present invention.

FIG. 9 is a view showing a plurality of fluorescent lamps 100 installed in the backlight assembly according to an exemplary embodiment of the present invention. Each of the fluorescent lamps 100 is identical to the fluorescent lamp 100 shown in FIG. 1.

Referring to FIG. 9, the power supply board 500 has a plurality of coupling protrusions 510, each being coupled to an inverter inserting groove 421 of a housing 400. That is, each of the coupling protrusions 510 may be inserted into the inverter inserting groove 421 of a housing 400, by sliding the protrusion 510 into the corresponding inverter inserting groove 421.

The power supply board 500 may include a PCB and a power supply element mounted on the PCB. A plurality of power output terminals are formed along an edge of the power supply board 500. For example, the power supply output terminals may be formed by partially exposing conductive wiring formed in the PCB.

According to an exemplary embodiment, the power output terminals are formed on an upper surface 501 of the power supply board 500, and each of the power output terminals contacts the terminal portion 310 to supply power to the terminal portion 310. More specifically, a first power output terminal, which supplies positive power (+), contacts the first terminal portion 311 of the first power supply terminal 301 and is thus electrically connected to the first terminal portion 311, and a second power output terminal, which supplies negative power (−), contacts the second terminal portion 312 of the second power supply terminal 302 and is thus electrically connected to the second terminal portion 312. In another embodiment, the power output terminals may be formed on a lower surface of the power supply board 500 or may be formed on both the upper and lower surfaces of the power supply board 500.

Figure 10:
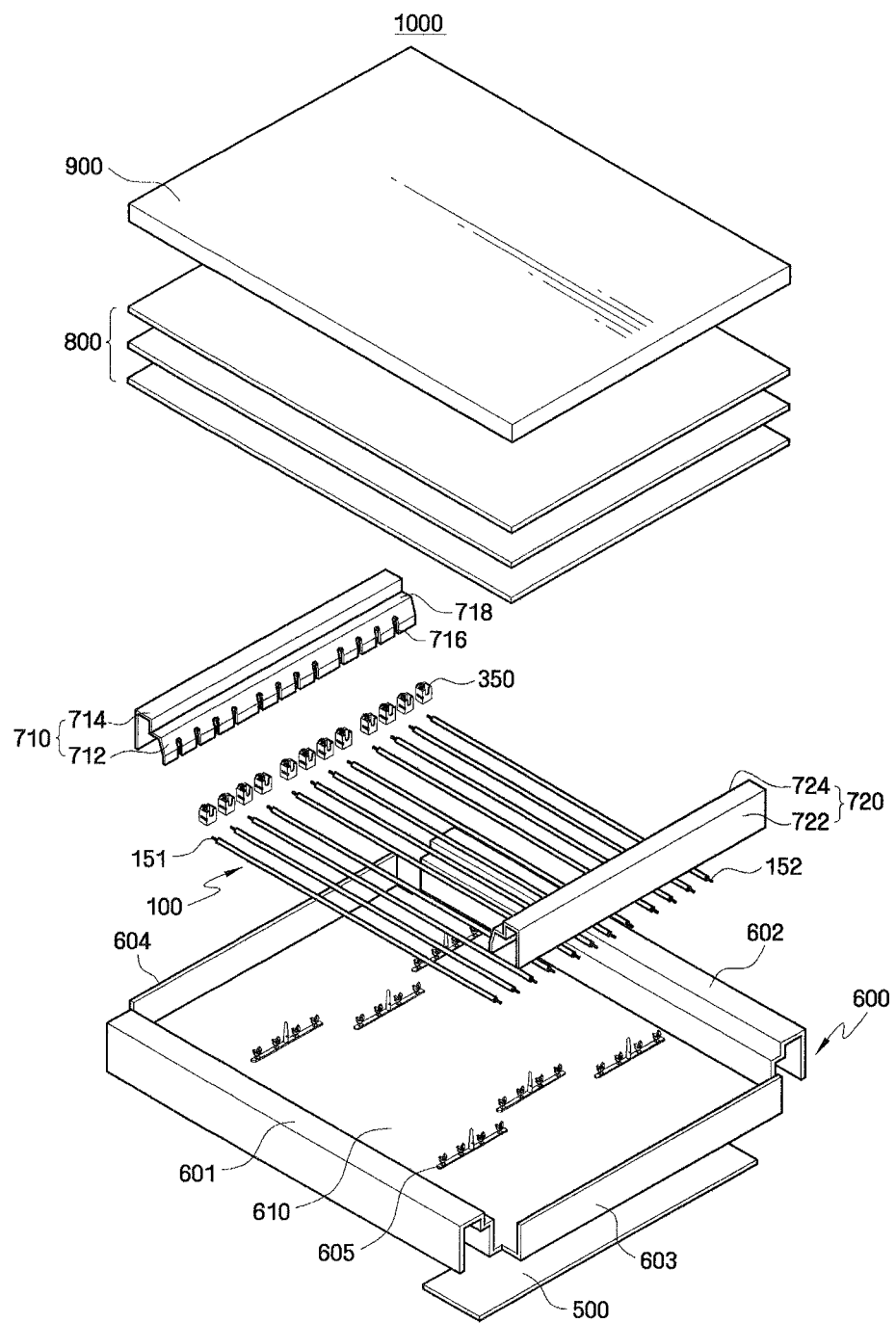
FIG. 10 is a view showing a display device according to an exemplary embodiment of the present invention.

FIG. 10 is a view showing a display device 1000 according to an exemplary embodiment of the present invention.

Referring to FIG. 10, the display device 1000 includes a plurality of fluorescent lamps 100, a power supply board 500, a case 600, a first side cover 710, a second side cover 720, an optical member 800, and a display panel 900.

The fluorescent lamps 100 and the power supply board 500 are identical to those described above in the embodiment of the backlight assembly.

The backlight assembly may further include a plurality of lamp supports 605. The lamp supports 605 are fixed to a bottom plate 610 of the case 600. The lamp supports 605 are used to arrange the fluorescent lamps 100 parallel to each other and prevent the fluorescent lamps 100 from drooping. The case 600 includes the bottom plate 610 and first, second, third and fourth sidewalls 601, 602, 603 and 604 which protrude from edges of the bottom plate 610 to form a receiving space. The case 600 houses the backlight assembly including the lamp supports 605, the fluorescent lamps 100, and the remaining components in the receiving space defined by the first, second, third and fourth sidewalls 601, 602, 603 and 604 and the bottom plate 610. The case 600 may further include a reflective plate (not shown) which is disposed on the bottom plate 610 and reflects light emitted from the fluorescent lamps 100 toward the display panel 900.

The backlight assembly may further include the first side cover 710, the second side cover 720, and the optical member 800.

The first side cover 710 is disposed along the fourth sidewall 604 and covers a first electrode portion 151 of each of the fluorescent lamps 100. The first side cover 710 includes a support plate 712 and a top plate 714. The support plate 712 faces the fourth sidewall 604 and is in contact with the bottom plate 610. A plurality of guide grooves 716 are formed in the support plate 712 to prevent interference with the fluorescent lamps 100. The top plate 714 extends from the support plate 712 to face the bottom plate 610. The top plate 714 includes a step portion 718 on which the optical member 800 is mounted.

The second side cover 720 is disposed along the third sidewall 603 and covers a second electrode portion 152 of each of the fluorescent lamps 100. The second side cover 720 includes a support plate 722 and a top plate 724. The other elements of the second side cover 720 are identical to those of the first side cover 710.

The optical member 800 enhances optical characteristics (e.g., luminance uniformity and front luminance) of light emitted from the fluorescent lamps 100 and directs the light with the enhanced optical characteristics in an upward direction. The optical member 800 is supported by the first, second, third and fourth sidewalls 601, 602, 603 and 604 of the case 600 and/or a side mold. The optical member 800 may include a diffusion plate, a diffusion sheet, and condensing sheets. The diffusion plate and the diffusion sheet diffuse light emitted from the fluorescent lamps 100 and output the light with enhanced luminance uniformity. The condensing sheets condense light from the diffusion plate in different directions, for example, in directions perpendicular to each other, thereby increasing front luminance of the backlight assembly.

According to the embodiments of the present invention described above, a backlight assembly employing hot cathode fluorescent lamps (HCFLs) can be assembled with increased efficiency. Since the process of assembling the backlight assembly can be simplified, the time required to assemble the backlight assembly is reduced. In addition, since the assembling process can be automated, manufacturing costs are reduced.

Furthermore, lamp leads of each HCFL can be stably coupled to power supply terminals by end caps, thereby improving electrical characteristics while preventing defects.

Also, the end caps protect the lamp leads of each HCFL from being damaged during the assembling process.

Accordingly, a display device having the backlight assembly of the exemplary embodiments can be assembled with increased efficiency and have improved reliability.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense and not for purposes of limitation.

What is claimed is:

1. A backlight assembly comprising:
a fluorescent lamp comprising a fluorescent lamp tube and a plurality of lamp leads formed at an end of the fluorescent lamp tube;
an end cap surrounding the end of the fluorescent lamp tube and fixing the lamp leads in place; and
a power supply terminal unit supplying power to the lamp leads,
wherein the end cap exposes at least part of each of the lamp leads, wherein the power supply terminal unit includes two opposite curved portions separated from each other, the two opposite curved portions jointly holding the exposed parts of the lamp leads.

2. The backlight assembly of claim 1, wherein the lamp leads comprise a first lamp lead receiving a first power and a second lamp lead separated from the first lamp lead and receiving a second power.

3. The backlight assembly of claim 2, wherein the first lamp lead is electrically connected to a first end of a hot electron emitter disposed in the fluorescent lamp tube, and the second lamp lead is electrically connected to a second end of the hot electron emitter.

4. The backlight assembly of claim 2, wherein the power supply terminal unit comprises a first power supply terminal contacting the first lamp lead and a second power supply terminal separated from the first power supply and contacting the second lamp lead.

5. The backlight assembly of claim 4, wherein the power supply terminal unit comprises a coupling portion coupled to the end cap and restricting movement of the end cap.

6. The backlight assembly of claim 5, wherein the first power supply terminal comprises a first receiving portion, and the second power supply terminal comprises a second receiving portion, wherein a gap between the first receiving portion and the second receiving portion increases as the distance from the coupling portion increases.

7. The backlight assembly of claim 6, wherein, upon the application of pressure to the end cap, the end cap is inserted between the first receiving portion and the second receiving portion and is fixed in place by the coupling portion.

8. The backlight assembly of claim 4, wherein the first power supply terminal and the second power supply terminal respectively transmit voltages having opposite polarities from each other.

9. The backlight assembly of claim 1, wherein the end cap comprises lead exposing portions, each lead exposing portion exposing a portion of one of the lamp leads, wherein the portion of each of the lamp leads which is exposed through one of the lead exposing portions contacts the power supply terminal unit.

10. The backlight assembly of claim 1, wherein the end cap comprises an insulating material.

11. The backlight assembly of claim 1, wherein the end cap comprises a lamp end receiving portion surrounding the end of the fluorescent lamp tube and a lead receiving portion receiving the lamp leads.

12. The backlight assembly of claim 11, wherein the lamp end receiving portion and the lead receiving portion are formed as a single piece.

13. The backlight assembly of claim 11, wherein an inner diameter of the lamp end receiving portion is substantially equal to a diameter of the fluorescent lamp tube, and a diameter of the lead receiving portion is smaller than the inner diameter of the lamp end receiving portion.

14. The backlight assembly of claim 11, wherein the lead receiving portion comprises lead exposing portions, each lead exposing portion exposing a portion of one of the lamp leads, wherein a width of each of the lead exposing portions is equal to or greater than a width of portions of the power supply terminal unit contacting the lamp leads at each respective lead exposing portion.

15. The backlight assembly of claim 1, further comprising a housing which houses the power supply terminal unit.

16. The backlight assembly of claim 15, wherein the housing includes a groove that receives a portion of a power supply board therein.

17. The backlight assembly of claim 1, wherein a plurality of fluorescent lamps are arranged parallel to each other.

18. The backlight assembly of claim 17, wherein the fluorescent lamps are driven in parallel.

19. A display device comprising:
a backlight assembly comprising a fluorescent lamp comprising a fluorescent lamp tube and a plurality of lamp leads formed at an end of the fluorescent lamp tube, an end cap surrounding the end of the fluorescent lamp tube and fixing the lamp leads in place, and a power supply terminal unit supplying power to the lamp leads; and
a display panel which displays an image using light emitted from the backlight assembly,
wherein the end cap exposes at least part of each of the lamp leads, and wherein the power supply terminal unit includes two opposite curved portions separated from each other, the two opposite curved portions jointly holding the exposed parts of the lamp leads.

20. A backlight assembly comprising:
a fluorescent lamp comprising a fluorescent lamp tube and a plurality of lamp leads formed at an end of the fluorescent lamp tube;
an end cap surrounding the end of the fluorescent lamp tube and fixing the lamp leads in place; and
a power supply terminal unit supplying power to the lamp leads,
wherein the end cap exposes at least part of each of the lamp leads,
wherein the lamp leads comprise a first lamp lead receiving a first power and a second lamp lead separated from the first lamp lead and receiving a second power,
wherein the power supply terminal unit comprises a first power supply terminal contacting the first lamp lead and a second power supply terminal separated from the first power supply and contacting the second lamp lead, wherein the power supply terminal unit comprises a coupling portion coupled to the end cap and restricting movement of the end cap, and wherein the first power supply terminal comprises a first receiving portion, and the second power supply terminal comprises a second receiving portion, wherein a gap between the first receiving portion and the second receiving portion increases as the distance from the coupling portion increases.

* * * * *